United States Patent
Jung et al.

(10) Patent No.: US 7,016,142 B2
(45) Date of Patent: Mar. 21, 2006

(54) APPARATUS AND METHOD FOR REMOVING MECHANICAL RESONANCE USING ADAPTIVE NOTCH FILTER

(75) Inventors: Kwang-Jo Jung, Suwon-si (KR); Chang-ik Kang, Jelu-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 5 days.

(21) Appl. No.: 10/768,177

(22) Filed: Feb. 2, 2004

(65) Prior Publication Data

US 2004/0212913 A1 Oct. 28, 2004

(30) Foreign Application Priority Data

Feb. 3, 2003 (KR) ...................... 10-2003-0006498

(51) Int. Cl.
*G11B 5/596* (2006.01)
(52) U.S. Cl. .................................................. 360/77.02
(58) Field of Classification Search .................. 360/75
See application file for complete search history.

(56) References Cited

U.S. PATENT DOCUMENTS

| | | | |
|---|---|---|---|
| 5,532,926 A | 7/1996 | Dunn et al. | |
| 6,219,196 B1 | 4/2001 | Semba et al. | |
| 6,246,536 B1 | 6/2001 | Galloway | |
| 6,574,065 B1 * | 6/2003 | Sri-Jayantha et al. | 360/75 |
| 2001/0028519 A1 | 10/2001 | Tan et al. | |
| 2002/0041472 A1 | 4/2002 | Ding et al. | |

FOREIGN PATENT DOCUMENTS

| | | |
|---|---|---|
| KR | 2000-0047652 | 7/2000 |
| KR | 2000-47652 | 7/2000 |
| KR | 2001-53206 | 6/2001 |

OTHER PUBLICATIONS

Notice of Office Action issued by the Korean Patent Office on Mar. 16, 2005 for Application No. 10-2003-0006498.

* cited by examiner

*Primary Examiner*—David Hudspeth
*Assistant Examiner*—Mitchell Slavitt
(74) *Attorney, Agent, or Firm*—Staas & Halsey LLP

(57) ABSTRACT

An apparatus and method for removing mechanical resonance in a disc drive using an adaptive notch filter. Mechanical resonance harmful to a system is removed by a notch filter that adaptively varies the frequency characteristics of the filter with respect to the mechanical resonance frequency existing in the system. The mechanical resonance removing apparatus using an adaptive notch filter comprises an excitation signal generator, which in a predetermined notch filter adjusting mode generates an excitation signal exciting the system and provides the signal to the system, a resonance frequency estimator detecting a resonance frequency component from a responding signal from the system corresponding to the excitation signal, a notch filter coefficient generator determining coefficients of a notch filter corresponding to the resonance frequency component detected by the resonance detection unit and the notch filter applying the coefficients determined by the notch filter coefficient generator, to remove the resonance frequency of the system.

24 Claims, 9 Drawing Sheets

BACKGROUND

APPARATUS AND METHOD FOR REMOVING MECHANICAL RESONANCE USING ADAPTIVE NOTCH FILTER

CROSS-REFERENCE TO RELATED APPLICATIONS

This application claims benefit from Korean Patent Application No. 2003-6498, filed Feb. 3, 2003, the disclosure of which is incorporated herein by reference.

BACKGROUND OF THE INVENTION

1. Field of the Invention

The present invention relates to an apparatus and method removing mechanical resonance of a system, and more particularly, to an apparatus and method removing mechanical resonance in a disc drive using an adaptive notch filter and varying its frequency characteristics of the filter based on the mechanical resonance frequency existing in the system.

2. Description of the Related Art

Generally, a hard disc drive (HDD) that is a data storage system includes a head disc assembly (HDA) with mechanical components and electronic circuits. Harmful resonance generated in a head stack assembly (HSA) in the HAD appears directly as a position error signal (PES) degrading stability of the servo tracking control of the HDD.

In conventional attempts to solve this problem, the resonance frequency having a harmful influence on the HDD is determined from the frequency of the PES and removed by being filtered or screened. The filters used to remove the determined resonance frequency are designed in an initial development stage based on resonance frequency components identified in the PES of a predetermined number of HDDs. The designed filters are applied commonly to all HDDs.

However, the resonance frequency varies according to the individual characteristics of components in an HSA or the assembly. This variance of the resonance frequency among HSAs having different characteristics results in a problem that cannot be solved by notch filters based on fixed filter coefficients commonly applied to all HDDs.

A conventional technology developed to attempt to solve this problem uses two notch filters 121 and 122, having different frequency characteristics, to remove a resonance frequency, as shown in FIG. 1.

A servo controller 110 uses a PES that is the output signal of a voice coil motor (VCM) actuator 140 to generate a control signal moving the position of a transducer to the center of a target track. The notch filter removes a resonance frequency component in a control signal that may stimulate the VCM actuator 140. Since this resonance frequency varies according to individual characteristics of a transducer, the notch filters 121 and 122 are designed to have different central frequencies to remove major resonant points previously designated through experiments using similar transducers. As a result, a multiplexer 130 selects one of the notch filters 121 and 122, according to an operation of the transducer, to attempt to reduce mechanical resonance.

In the conventional apparatus using two notch filters, each notch filter is also designed to have having characteristics based on a fixed frequency. However, the resonance frequency of an actuator is actually different for each unit. Even in a single unit, resonance varies with respect to a surrounding temperature. Accordingly, due to the fixed central frequency of the notch filters, the related art cannot prevent resonance when the resonance frequency varies according to an operating condition.

SUMMARY OF THE INVENTION

According to an aspect of the present invention, an apparatus and method for removing mechanical resonance is provided using an adaptive notch filter and detecting a resonance frequency whenever a system is used and coefficients of the notch filter are automatically varied, to remove the detected resonance frequency.

According to an aspect of the present invention, a mechanical resonance removing apparatus is provided using an adaptive notch filter removing a resonance frequency of a system. The apparatus includes an excitation signal generator, which in a predetermined notch filter adjusting mode generates an excitation signal exciting the system and provides the signal to the system. A resonance frequency estimator detects a resonance frequency component from a responding signal from the system corresponding to the excitation signal. The apparatus also includes a notch filter coefficient generator determining coefficients of a notch filter corresponding to the resonance frequency component detected by the resonance frequency estimator, and the notch filter applying the coefficients determined by the notch filter coefficient generator, to remove the resonance frequency of the system.

According to another aspect of the present invention, a mechanical resonance removing method is provided using an adaptive notch filter to remove a resonance frequency of a system. The method includes providing a predetermined excitation signal to a system to excite the system and estimating a resonance frequency from a responding signal from the system while in a predetermined notch filter adjusting mode. The method further includes determining coefficients of the notch filter corresponding to the estimated resonance frequency, and applying the determined notch filter coefficients to the notch filter, to remove the resonance frequency of the system.

According to still another aspect of the present invention, a mechanical resonance removing apparatus of a disc drive using an adaptive notch filter to remove a resonance frequency of the disc drive is provided. The apparatus includes a voice coil motor actuator moving a transducer according to a VCM control signal and generating a servo control signal, a switch having the control signal input to an input terminal of the switch, and the output terminal of the switch connected to a resonance frequency estimator. The switching is controlled so that the input terminal and output terminal are connected during a notch filter adjusting mode interval. The apparatus further includes an excitation signal generator generating an excitation signal to excite the disc drive only during the notch filter adjusting mode interval, a mixer mixing the excitation signal with the control signal, and a servo controller using the signal output from the mixer and generating a VCM control signal controlling the voice coil motor. A resonance frequency estimator detects a resonance frequency component from the switch's output signal output from the switch, and a notch filter coefficient generator determines coefficients of a notch filter so that the coefficients have a frequency characteristic used in removing the resonance frequency component detected in the resonance frequency estimator. The apparatus further includes the notch filter. By applying the coefficients determined by the notch filter coefficient generator, the notch filter filters and outputs the servo control signal. The apparatus further includes a multiplexer having a first input terminal connected to the VCM control signal output from the servo controller and a second input terminal connected to the VCM control signal filtered and output from the notch filter. The signal input through the first input terminal is output only during the adjusting mode interval, and the signal input through the second input terminal is selected and output during other intervals.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become more readily appreciated from the following description of the embodiments, taken in conjunction with the accompanying drawings of which.

DETAILED DESCRIPTION OF THE PREFERRED EMBODIMENTS

Figure 1:
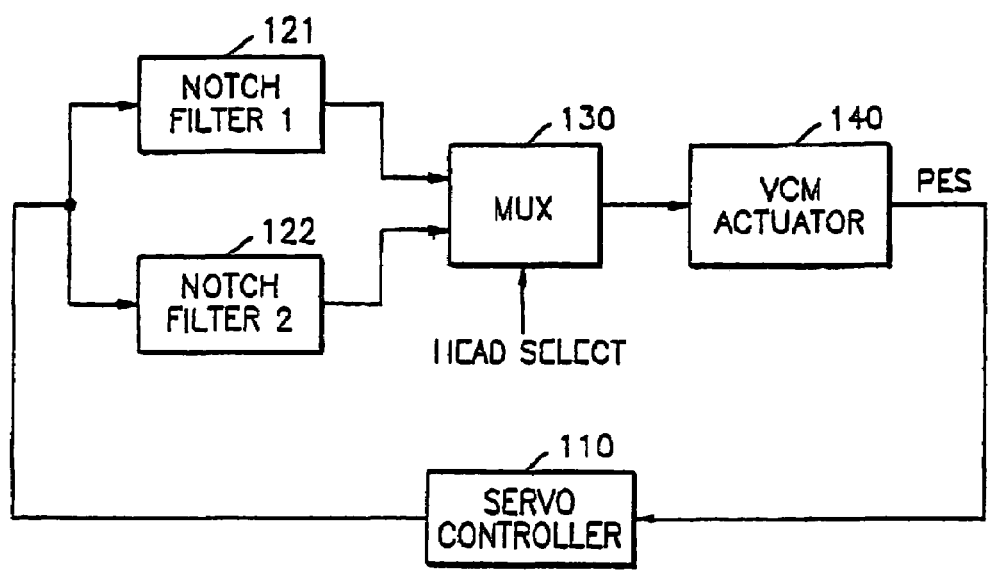
FIG. 1 is a diagram of a conventional resonance frequency reducing apparatus of an HDD.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
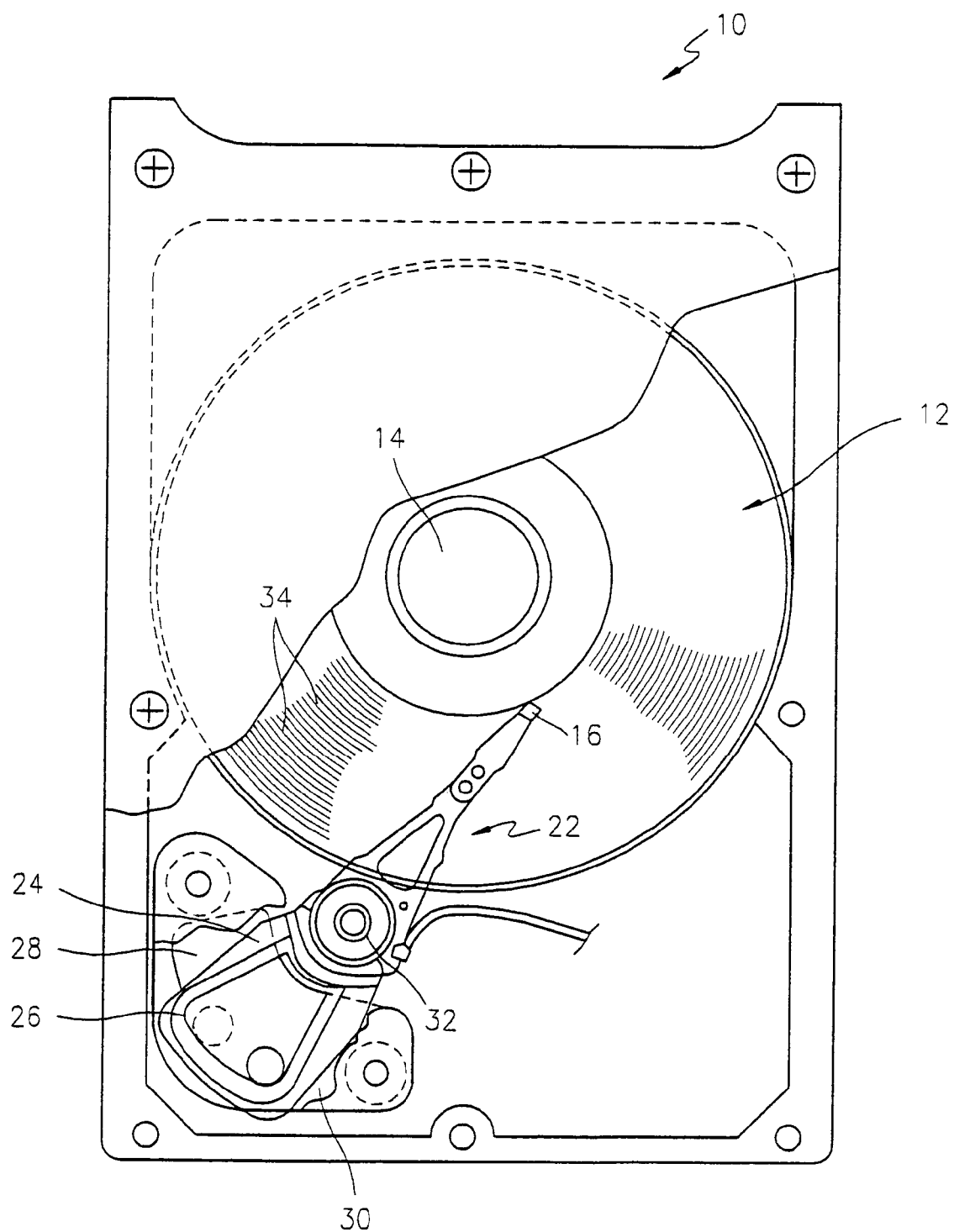
FIG. 2 is a plane view of a disc drive to which an aspect of the present invention is applied.

FIG. 2 shows an HDD to which an aspect of the present invention is applied. The drive 10 includes at least one magnetic disc 12 rotatable by a spindle motor 14. The drive also includes a transducer (not shown) positioned close to the surface of a disc.

The transducer senses and magnetizes a magnetic field of each disc 12 such that information is read from or written to the rotating disc 12. The transducer is coupled with the surface of each disc. The transducer includes a writing transducer magnetizing the disc 12 and a reading transducer sensing the magnetic field of the disc 12. The reading transducer is implemented using magneto-resistive (MR) devices.

The transducer may be integrated into a head 16. The head has a generating air bearing between the transducer and the disc surface and is coupled to a head stack assembly (HSA) 22. The HSA 22 is attached to an actuator arm 24 having a voice coil 26. The voice coil 26 is disposed close to a magnetic assembly 28 defining a voice coil motor (VCM) 30. The current supplied to the voice coil 26 generates torque rotating the actuator arm 24 about a bearing assembly 32. The rotation of the actuator arm 24 moves the transducer across the surface of the disc.

Information is stored in annular tracks on the disc 12. Generally, each track 34 contains a plurality of sectors. Each sector includes a data field and an identification field. The identification field contains a gray code identifying the sector and the track (cylinder). The transducer moves across the disc surface reading information from or write information on another track.

Figure 3:
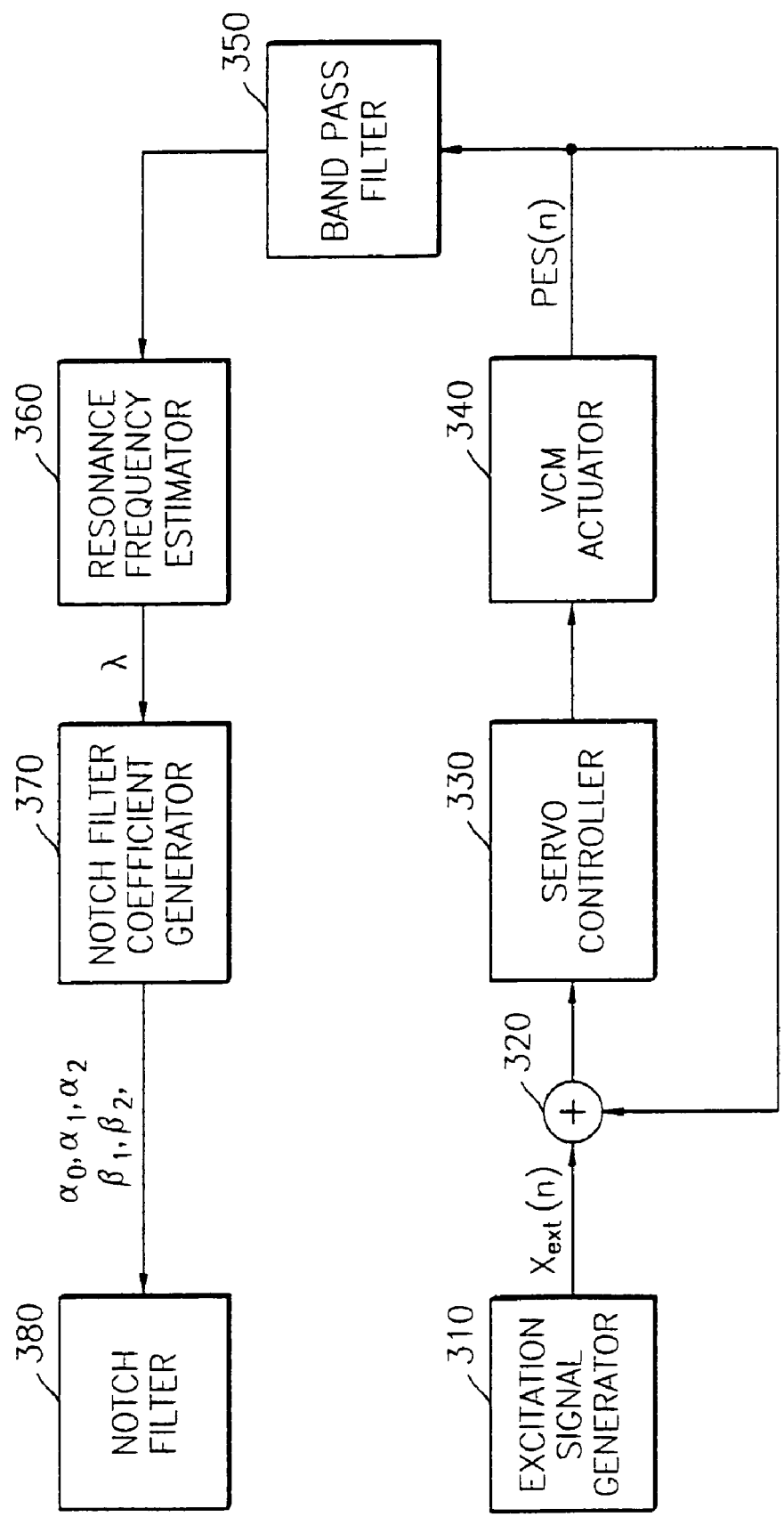
FIG. 3 is a diagram of a resonance frequency estimating apparatus determining adaptive notch filter coefficients according to an aspect of the present invention.

As shown in FIG. 3, a mechanical resonance removing apparatus using an adaptive notch filter according to an aspect of the present invention includes an excitation signal generator 310, a mixer 320, a servo controller 330, a VCM actuator 340, a band pass filter 350, a resonance frequency estimator 360, a notch filter coefficient generator 370, and a notch filter 380.

The notch filter 380 removes a resonance frequency component in a control signal and is operable as a second-order infinite impulse response (IIR) filter corresponding to the following equation (1):

$$H_n(z) = \frac{\alpha_0 z^2 + \alpha_1 z + \alpha_2}{z^2 + \beta_1 z + \beta_2} \quad (1)$$

Filter coefficients $\alpha_0$, $\alpha_1$, $\alpha_2$, $\beta_1$, and $\beta_2$ are defined according to equation (2):

$$\alpha_0 = \frac{1 + 2\xi\alpha\Omega_n + \Omega_n^2}{1 + 2\xi\Omega_n + \Omega_n^2}, \quad (2)$$

$$\alpha_1 = \frac{2(\Omega_n^2 - 1)}{1 + 2\xi\Omega_n + \Omega_n^2},$$

$$\alpha_2 = \frac{1 - 2\xi\alpha\Omega_n + \Omega_n^2}{1 + 2\xi\Omega_n + \Omega_n^2},$$

$$\beta_1 = \frac{2(\Omega_n^2 - 1)}{1 + 2\xi\Omega_n + \Omega_n^2},$$

$$\beta_0 = \frac{1 - 2\xi\Omega_n + \Omega_n^2}{1 + 2\xi\Omega_n + \Omega_n^2}$$

Parameters $\alpha$ and $\xi$, representing a damping coefficient, determine a gain and a notch width at a central frequency ($f_c$). Parameter $\Omega_n$ is determined by a central frequency and a sampling time ($T_s$) according to equation (3):

$$\Omega_n = \tan\frac{2\pi f_c T_s}{2} \quad (3)$$

Figure 5:
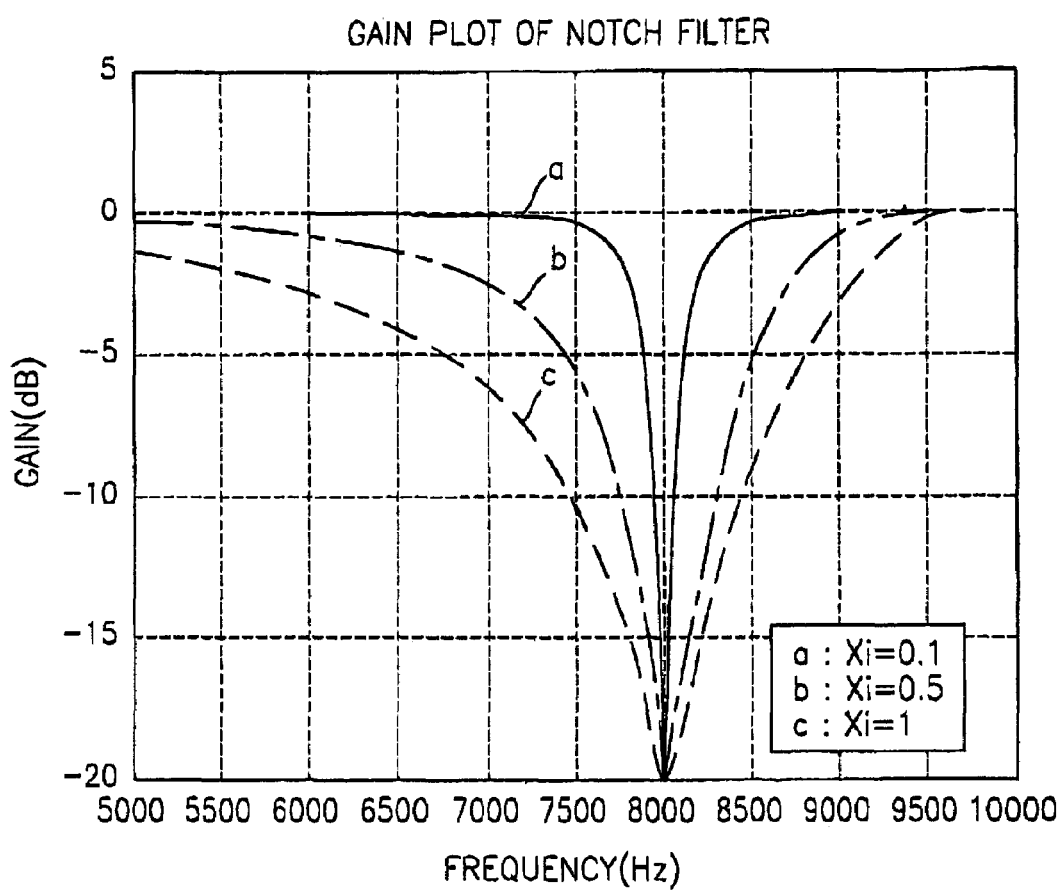
FIG. 5 is a graph showing the frequency gain characteristic of a notch filter as applied to an aspect of the present invention.
Figure 6:
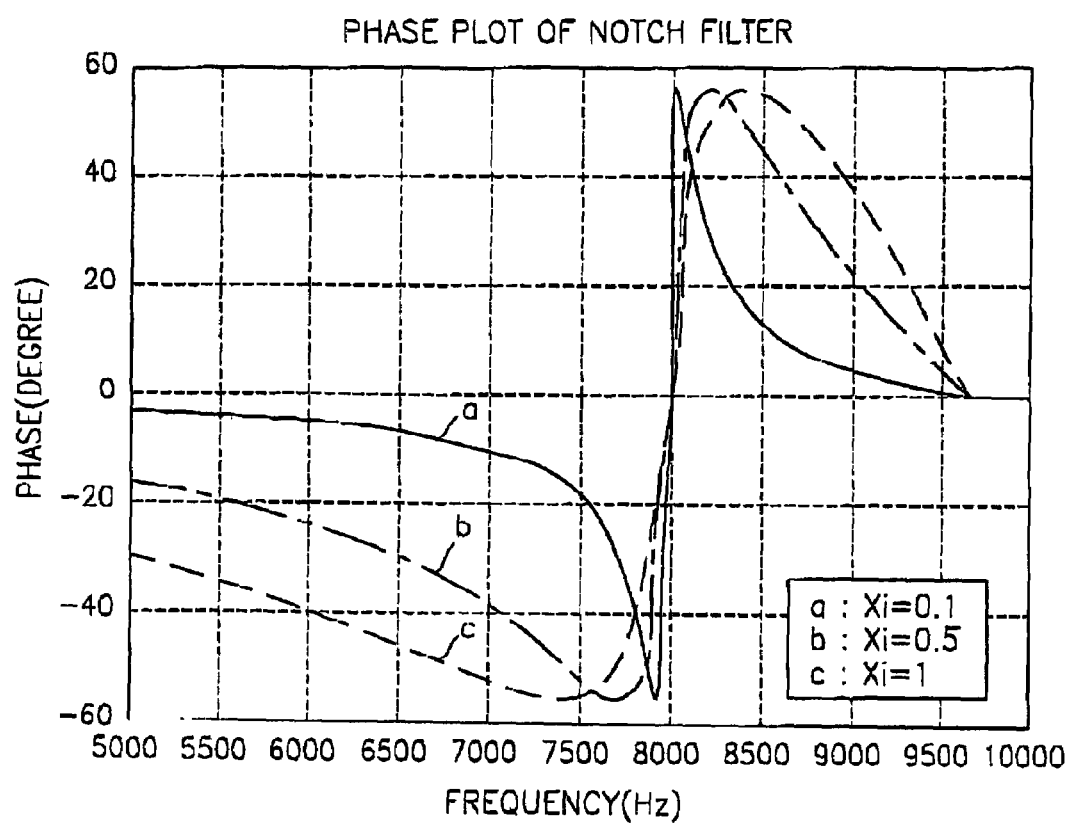
FIG. 6 is a graph showing the frequency phase characteristic of a notch filter applied to an aspect of the present invention.

FIG. 5 shows the frequency gain characteristic of an IIR notch filter and that the notch width increases in proportion to the increase of parameter $\xi$ value. FIG. 6 shows the frequency phase characteristic of an IIR notch filter and that the phase delay amount increases in proportion to the increase of parameter $\xi$ value and therefore the phase margin of the control system decreases. Accordingly, to minimize a phase loss, it is necessary to use a notch filter having a low $\xi$ value. However, when the notch width decreases and the resonance frequency varies, the resonance restriction is less effective.

An excitation signal $x_{ext}(n)$ generated in the excitation signal generator 310 is expressed in the following equation (4):

$$X_{ext}(n)=\sin(\omega_1 T_s n)+\sin(\omega_2 T_s n)+\sin(\omega_3 T_s n)+\ldots+\sin(\omega_N T_s n) \quad (4)$$

Figure 7:
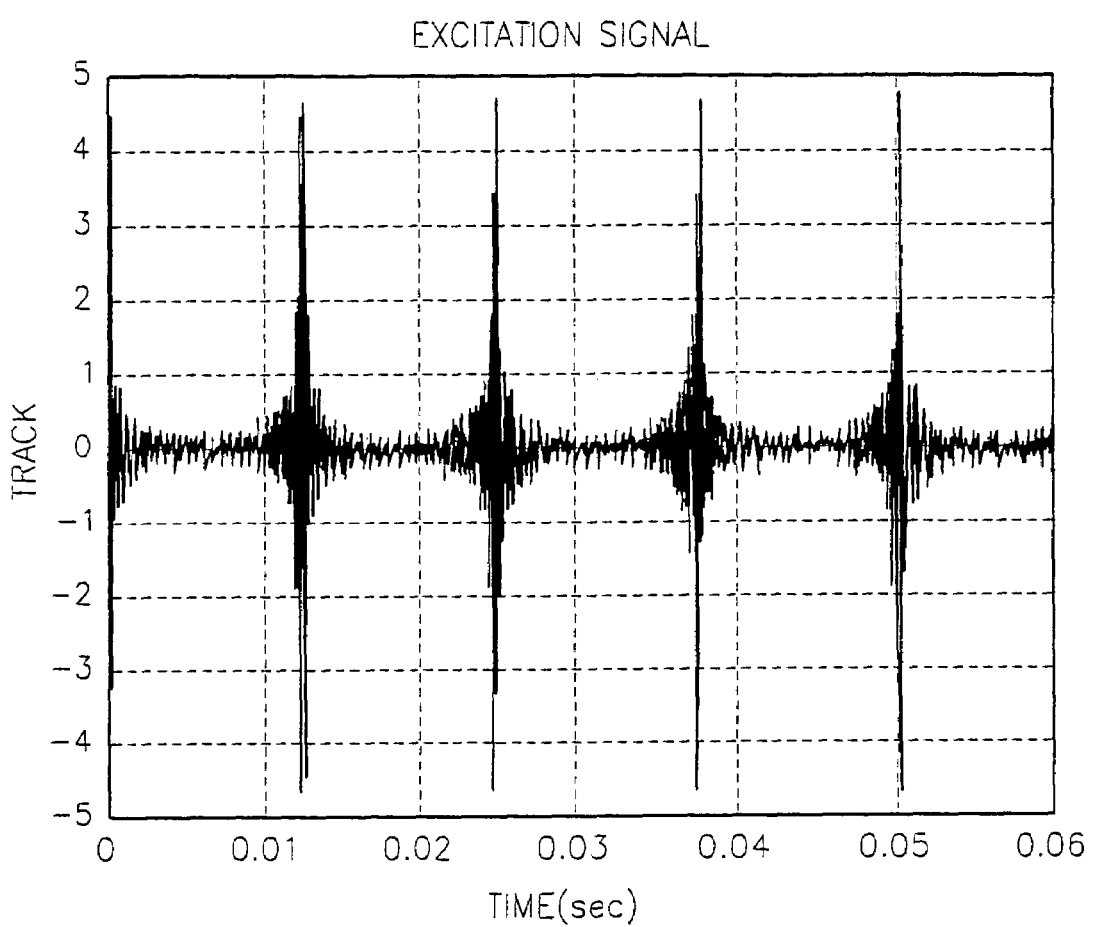
FIG. 7 is a graph showing an example of an excitation signal occurring in an aspect of the present invention.

In equation (4), $\omega_1$, $\omega_2$, $\omega_3$, $\omega_N$ denote resonance frequency candidates. Accordingly, the excitation signal of equation (4) corresponds to a signal obtained by synthesizing all resonance frequency components expected in the system. As an example, an excitation signal obtained by synthesizing frequency components at 8 kHz is shown in FIG. 7.

Thus, the excitation signal generated in the excitation signal generator 310 is mixed in the mixer 320 with a servo control signal generated in the VCM actuator 340 and provided to the servo controller 330. According to an aspect of the present invention, the servo control signal is a PES.

The servo controller 330 generates a VCM control signal controlling a voice coil motor by using the servo control signal, in which the excitation signal is synthesized, positioning the transducer at the center of a target track and providing the VCM control signal to the VCM actuator 340.

Figure 8:
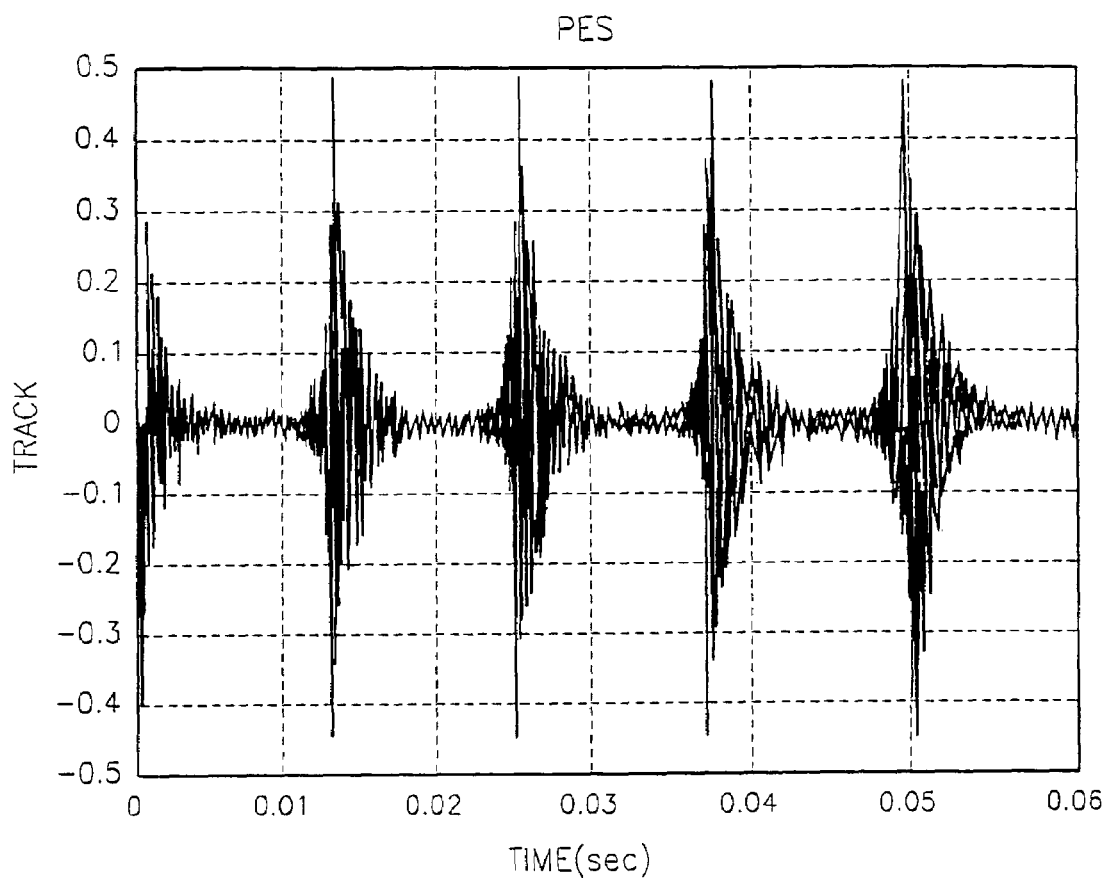
FIG. 8 is a graph showing an example of a PES occurring by an excitation signal of an aspect of the present invention.

The VCM actuator 340 is driven by the current provided to the voice coil motor and vibrates by the excitation signal generated in the excitation signal generator 310. The excitation signal is reflected in an PES generated in the VCM actuator 340 and output. An example of the PES in which the excitation signal is reflected is shown in FIG. 8.

The band pass filter 350 is used to extract only the frequency band component of the excitation signal from this PES.

According to an aspect of the present invention, the band pass filter 350 is used as a second-order filter and is designed to have the frequency characteristic as in the following equation (5):

$$H_{bp}(z) = K \frac{z^2 - 1}{z^2 - (2\gamma\cos\omega_c)z + \gamma^2} \quad (5)$$

Parameters $\omega_c$, $\gamma$, and K determine a central frequency, a pass bandwidth, and the gain at the central frequency, respectively.

The resonance frequency estimator 360 estimates a resonance frequency from the PES output from the band pass filter 350. The resonance frequency estimator 360 includes a finite impulse response (FIR) filter capable of varying coefficients and a filter coefficient adjusting apparatus. According to an aspect of the present invention, the resonance frequency estimator 360 is constructed with a coefficient variable FIR notch filter and the relation of the input and output is expressed as the following equation (6):

$$y(n)=x(n)-2\lambda(n)x(n-1)+x(n-2) \quad (6)$$

Here, $x(n)$ denotes a PES signal and $\lambda(n)$ is a variable coefficient.

The PES that is an input signal is formed as the sum of a variety of frequency signals having different magnitudes. The frequency having the largest magnitude corresponds to a resonance frequency to be found. To find this resonance frequency, the variable coefficient $\lambda(n)$ is adjusted. In this case, the variable coefficient $\lambda(n)$ is adjusted so that the average value of the output signal $y(n)$ is minimized. The reason is that the central frequency of the notch filter varies according to the variable coefficient and when the central frequency is the same as a frequency at which the PES is the largest magnitude, that is, the resonance frequency, the magnitude of the output signal $y(n)$ is minimized. When the frequency having the largest magnitude is attenuated, the magnitude of the output signal is minimized.

A variable coefficient adjusting expression, adjusting the average value of the output to be minimized, is obtained by applying the least mean square (LMS) theory according to the following equation (7):

$$\lambda(n+1)=\lambda(n)+2k_c y(n)x(n-1) \quad (7)$$

The constant $k_c$ denotes an estimation gain.

The resonance frequency estimation expression of the equation (7) gives the product of the output signal $y(n)$ and the previous input signal $x(n-1)$ as continuously accumulated. If the coefficient $\lambda(n)$ of the coefficient variable FIR notch filter is thus varied, as time goes by, the output signal converges on a value in which the magnitude of the signal is minimized, and the value of the variable coefficient converges on a predetermined value. The value on which the variable coefficient is converging relates to the frequency at which the input signal is the largest magnitude signal, that is, the resonance frequency. After a predetermined time, the variable coefficient $\lambda(n)$ converges on $\cos(2\pi f_{res} T_s)$.

Figure 9:
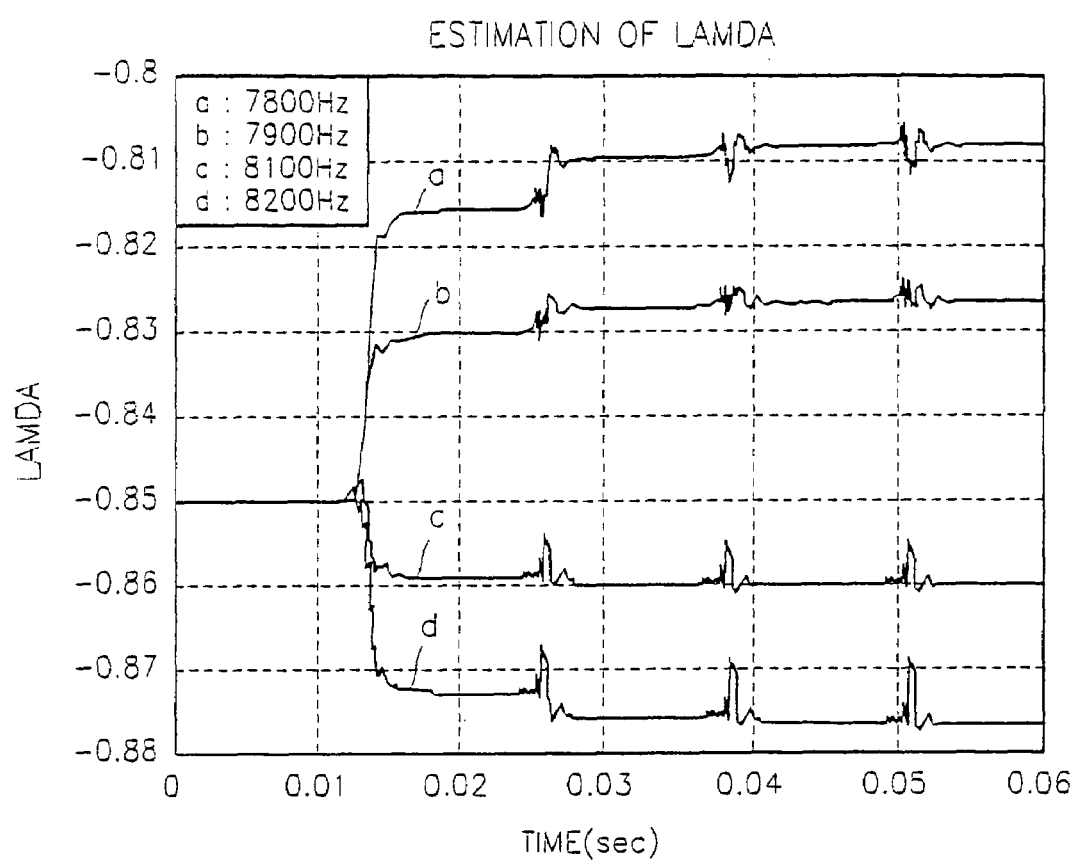
FIG. 9 is a graph showing the resonance frequency estimation performance of a resonance frequency estimating apparatus applied to an aspect of the present invention.

The resonance frequency estimation performance of the resonance frequency estimator 360 is shown in FIG. 9.

Next, the notch filter coefficient generator 370 calculates notch filter coefficients by using equation (2) and the convergence value of the variable coefficients.

In equation (2), parameters $\alpha$ and $\xi$ are predetermined values and $\Omega_n$ is calculated from the convergence value of the variable coefficients by the following equation (8):

$$\Omega_n^2 = \left[\tan\left(\frac{2\pi f_{res} T_s}{2}\right)\right]^2 = \frac{1 - \cos(2\pi f_{res} T_s)}{1 + \cos(2\pi f_{res} T_s)} = \frac{1 - \lambda}{1 + \lambda} \quad (8)$$

The notch filter 380 applies the calculated notch filter coefficients restricting the mechanical resonance of the system.

According to an aspect of the present invention, the mechanical resonance frequency of a system is estimated by an excitation signal and the coefficients of notch filters are varied appropriately to restrict the estimated resonance frequency.

This process for estimating a resonance frequency and adjusting notch filter coefficients is more effective if the process is carried out whenever a system is turned on.

Figure 4:
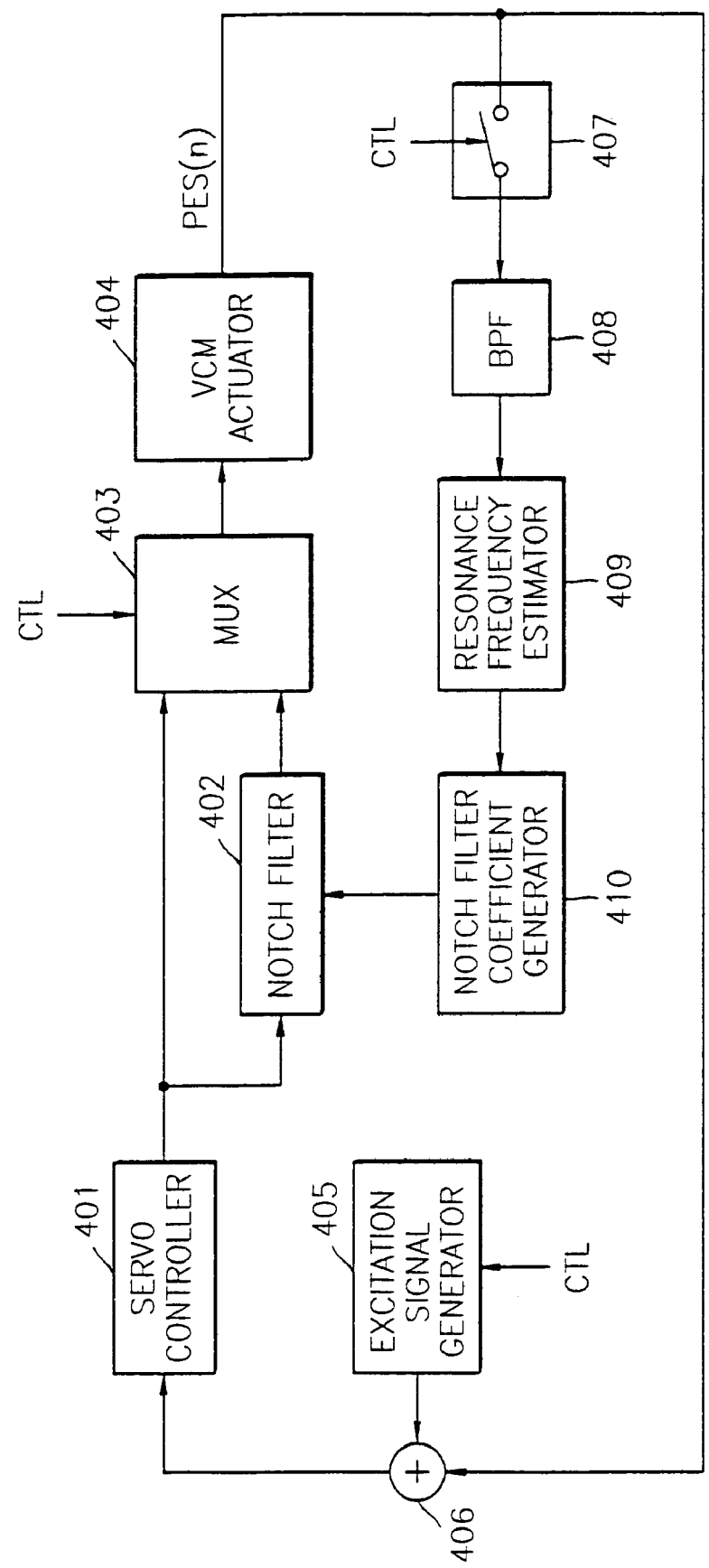
FIG. 4 is a diagram of a disc drive to which a mechanical resonance removing apparatus using adaptive notch filter coefficients according to the present invention is applied.

FIG. 4 is a diagram of an electric circuit of a disc drive having a mechanical resonance removing apparatus using adaptive notch filters according to an aspect of the present invention.

An excitation signal generator 405, a mixer 406, a servo controller 401, a VCM actuator 404, a band pass filter 408, a resonance frequency estimator 409, a notch filter coefficient generator 410, and a notch filter 402 shown in FIG. 4 are similar to the circuit structure shown in FIG. 3.

As shown in FIG. 4, a multiplexer 403 and a switch 407 are added so as to adjust the coefficients of the notch filter only in a notch filter adjusting mode.

According to an aspect of the present invention, the notch filter adjusting mode adjusting coefficients of the notch filter is more efficient when it is designed to be executed at a time of transition when the power of a disc drive is turned on.

If the disc drive is in the notch filter adjusting mode, the system controller (not shown) of the disc drive generates a system control signal (CTL) controlling the notch filter adjusting mode.

The excitation signal generator 405 is enabled only in the notch filter adjusting mode by the system control signal (CTL) and is disabled in other modes.

The multiplexer 403 provides a VCM control signal output from the servo controller 401, directly to the VCM actuator 404 in the notch filter adjusting mode, according to the system control signal (CTL). In other modes, the multiplexer 403 provides a VCM control signal, which is filtered through the notch filter 402, to the VCM actuator 404.

The switch 407 inputs a PES output from the VCM actuator 404 to the band pass filter 408 only in the notch filter adjusting mode according to the system control signal (CTL), and in other modes switches so that the PES is not provided to the band pass filter 408.

With this switching control, in the notch filter adjusting mode, the circuit connection of FIG. 4 is similar to the circuit state shown in FIG. 3 so that coefficients of the notch filter are adaptively adjusted.

In intervals other than in the notch filter adjusting mode, the servo controller 401, the notch filter 402, and the VCM actuator 404 are connected, in that order, in the circuit such that the mechanical resonance of the disc drive is reduced by the notch filter whose filter coefficients are adaptively adjusted.

According to an aspect of the present invention as described above, a potential resonance frequency of a system is estimated by artificial excitation of the system, and the coefficients of the notch filter are controlled and adjusted corresponding to the estimated resonance frequency. Thus, even though the resonance frequency varies with respect to the surrounding temperature or product temperature, the resonance frequency is accurately removed and the system is stably controlled.

Aspects of the present invention may be implemented as a method, an apparatus, or a system. Aspects of the present invention may also be embodied in a computer-readable medium. The computer-readable medium includes various recording medium on which computer-readable data is stored. The computer-readable media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer-readable media includes media dispersed on computer systems connected through a network and storing and executing a computer-readable code while in a distributed mode.

Although a few embodiments of the present invention have been shown and described, it would be appreciated by those skilled in the art that changes may be made in this embodiment without departing from the principles and spirit of the present invention defined, the scope of which is defined in the in the claims and their equivalents. Therefore, the scope of the present invention is not determined by the above description but by the accompanying claims.

What is claimed is:

1. A mechanical resonance removing apparatus using an adaptive notch filter to remove a resonance frequency of a system, the apparatus comprising:
   a notch filter;
   an excitation signal generator generating an excitation signal exciting the system and providing the excitation signal to the system when in a predetermined notch filter adjusting mode;
   a resonance frequency estimator detecting a resonance frequency component from a responding signal from the system corresponding to the excitation signal; and
   a notch filter coefficient generator determining coefficients of the notch filter corresponding to the resonance frequency component detected by the resonance frequency estimator,
   wherein the notch filter applies the coefficients determined by the notch filter coefficient generator, to remove the resonance frequency of the system.

2. The apparatus of claim 1, wherein the notch filter includes a second-order infinite impulse response (IIR) digital filter.

3. The apparatus of claim 1, wherein the excitation signal is obtained by synthesizing a plurality of resonance frequencies expected to be in the system.

4. The apparatus of claim 1, wherein a band pass filter extracting only a component of the frequency band of an excitation signal is added in front of the resonance frequency estimator.

5. The apparatus of claim 1, wherein the resonance frequency estimator comprises a finite impulse response (FIR) variable coefficient notch filter,
   wherein by adjusting variable coefficients of the FIR variable coefficient notch filter, a variable coefficient with which the output signal of the notch is minimized is obtained by calculating a convergence value of a variable coefficient corresponding to a response frequency based on a minimum average square theory.

6. The apparatus of claim 5, wherein the convergence value of the variable coefficient is obtained by a process in which the product of the output value at which the magnitude of the output signal is minimized and the previous input signal is continuously accumulated.

7. The apparatus of claim 1, wherein the notch filter adjusting mode occurs at a time of transition when the power of the system is turned on.

8. A computer-readable medium encoded with processing instructions implementing a method using an adaptive notch filter to remove a resonance frequency, the method comprising:
   providing a predetermined excitation signal to a system to excite the system in a predetermined notch filter adjusting mode;
   estimating a resonance frequency from a responding signal from the system while in the predetermined notch filter adjusting mode;
   determining coefficients of the adaptive notch filter corresponding to the estimated resonance frequency; and
   applying the determined notch filter coefficients to the notch filter, to remove the resonance frequency of the system.

9. The computer-readable medium according to claim 8, wherein the notch filter includes a second-order infinite impulse response (IIR) digital filter.

10. The computer-readable medium according to claim 8, wherein the excitation signal is a signal obtained by synthesizing a plurality of resonance frequencies expected to be in the system.

11. The computer-readable medium according to claim 8, wherein the estimating the resonance frequency comprises:

adjusting variable coefficients of the FIR variable coefficient notch filter using a finite impulse response (FIR) variable coefficient notch filter, and calculating a convergence value of a variable coefficient corresponding to a response frequency based on a minimum average square theory, to obtain a variable coefficient with which the output signal of the notch is minimized.

12. The computer-readable medium according to claim 8, wherein the notch filter adjusting mode occurs at a time of transition when the power of the system is turned on.

13. The computer-readable medium according to claim 8, wherein the computer-readable medium is a plurality of media dispersed through a network storing and executing the method while in a distributed mode.

14. The computer-readable medium according to claim 8, wherein the computer-readable medium is one of an magnetic storage medium, an optically readable medium, and carrier waves.

15. A mechanical resonance removing method using an adaptive notch filter, the method comprising:

outputting an excitation signal;

estimating a resonance frequency based on a response received to the excitation signal;

determining coefficients for the adaptive notch filter corresponding to the estimated resonance frequency; and applying the determined coefficients to the adaptive notch filter.

16. The mechanical resonance removing method according to claim 15, wherein the excitation signal is only output during a predetermined mode.

17. The mechanical resonance removing method according to claim 15, wherein the excitation signal is based on an expected resonance frequency.

18. The mechanical resonance removing method according to claim 15, wherein the coefficients minimize the output signal of the notch.

19. A method for removing mechanical resonance using a notch filter, comprising:

generating an excitation signal;

mixing the excitation signal with a position error signal;

generating a Voice Control Motor (VCM) control signal using the mixed signal;

controlling a voice coil motor using the VCM control signal;

extracting a frequency band component of the excitation signal from the position error signal;

estimating a resonance frequency from the extracted frequency band component;

adjusting a variable coefficient based on the estimated resonance frequency;

determining a convergence value for an output signal as the variable coefficient is adjusted; and generating coefficients for the notch filter using the convergence value.

20. The method according to claim 19, wherein the determined convergence value is the resonance frequency.

21. The method according to claim 19, wherein the coefficients are adjusted applying a minimum average square theory.

22. A disc drive having a mechanical resonance removing apparatus using an adaptive notch filter, comprising:

a signal generator, enabled only in a notch filter adjusting mode, generating an excitation signal;

a mixer mixing a position error signal from a VCM actuator and the excitation signal;

a servo controller generating a Voice Control Motor (VCM) control signal using the mixed signal;

a multiplexer, while in the notch filter adjusting mode, providing the VCM control signal to the VCM actuator;

a switch inputting the position error signal to a notch filter coefficient generator, while in the notch filter adjusting mode, to generate coefficients for the notch filter.

23. The disc drive according to claim 22, wherein the VCM actuator forms the position error signal as a sum of a plurality of frequency signals, the frequency having the largest magnitude corresponding to the frequency of the resonance frequency to be removed.

24. The disc drive according to claim 22, wherein the multiplexer, while in other than the notch filter adjusting mode, provides the VCM control signal filtered though the notch filter to the VCM actuator.

* * * * *

UNITED STATES PATENT AND TRADEMARK OFFICE
CERTIFICATE OF CORRECTION

PATENT NO. : 7,016,142 B2 Page 1 of 1
APPLICATION NO. : 10/768177
DATED : March 21, 2006
INVENTOR(S) : Kwang-Jo Jung et al.

It is certified that error appears in the above-identified patent and that said Letters Patent is hereby corrected as shown below:

Col. 9, Line 17, delete "an" and insert --a-- therefor.

Signed and Sealed this

Third Day of October, 2006

JON W. DUDAS
*Director of the United States Patent and Trademark Office*